UNITED STATES PATENT OFFICE.

OTTO PAUL CURT BREDT, OF NEW YORK, N. Y., ASSIGNOR OF THREE-FIFTHS TO RADIUM THERAPY CORPORATION, OF NEW YORK, N. Y., A CORPORATION OF NEW YORK.

PROCESS OF CONCENTRATING RADIUM ORES AND RESIDUES.

1,154,231.   Specification of Letters Patent.   Patented Sept. 21, 1915.

No Drawing.   Application filed December 30, 1914.   Serial No. 879,691.

*To all whom it may concern:*

Be it known that I, OTTO PAUL CURT BREDT, a citizen of the German Empire, residing at 170 William street, in the city, county, and State of New York, have invented new and useful Improvements in the Process of Concentrating Radium Ores and Residues, of which the following is a specification.

This invention relates to the extraction of radium from carnotite or other radium-containing ores or residues with the aid of boiling sulfuric acid, and to the concentration of such ores and residues; and it comprises the treatment of such ores or residues, which may first be freed from other metals such as vanadium, uranium and iron, with concentrated sulfuric acid to form metal bisulfates, including radium bi-sulfate, soluble in such acid, and the precipitation of the insoluble sulfates from such solution; it further comprises the concentration of such precipitates by fractional solution and removal by means of concentrated sulfuric acid of sulfates more soluble than radium sulfate, whereby the radium content of the undissolved precipitate is increased; and it further comprises certain novel improvements in such processes; all as more fully hereinafter set forth and as claimed.

In the production of sulfate residues containing radium sulfate the removal of sand and silica has heretofore been effected by the tedious process of fusing with alkali.

It is an object of the present invention to avoid this complicated procedure and to provide a process of concentration which shall be essentially one of direct solution and precipitation.

It is well known that the sulfate of radium is insoluble in water. It is also known that the sulfate of barium, in boiling sulfuric acid, changes to bi-sulfate and that the bi-sulfate is soluble in the boiling sulfuric acid. I have now found that radium sulfate also is changed to bi-sulfate by the action of boiling sulfuric acid and that this bi-sulfate also goes into solution. I have further found that the radium sulfate differs in solubility from the sulfates of calcium, strontium and barium, which sulfates also differ in solubility from each other, and that the radium sulfate is the most difficulty soluble, calcium sulfate being the most soluble. The process of the present invention makes use of these two discoveries for concentrating radium-containing ores and residues, which concentration can, for example, be effected in the following manner. Ore in a finely powdered condition, which may be first freed from other metals such as vanadium, uranium and iron, is boiled with the same quantity of sulfuric acid and filtered while hot, concentrated acid being used preferably of 96% $H_2SO_4$ strength. The partially exhausted residue left on the filter is retained for further treatment.

On cooling the bisulfate, dissolved in the sulfuric acid, changes to the insoluble sulfate and separates as a precipitate. Before filtering it is advisable to add about an equal quantity of cold water. The solution is filtered to obtain the precipitate which is a mixture of the four sulfates in which mixture the sulfates of barium and calcium usually predominate, particularly the sulfate of barium, while the precipitate contains only a small quantity of radium sulfate. Upon repeating the treament with sulfuric acid of the partially exhausted residue, it is found that the precipitate obtained has a much larger content of radium sulfate. The process is repeated with the ore until the ore is no longer radio-active. The sulfate of radium is thus obtained in the precipitate while the sand or silica is no longer present. The sulfate precipitates may be mixed with each other or may be separately concentrated. The first precipitates are usually lower in radium because of the greater solubility of the other sulfates. These various precipitates are freed from acid and moisture and thoroughly dried. The concentration of these precipitates, separately or collectively, can, for example, be effected in the following manner: A certain amount of the precipitate is boiled with an insufficient quantity of sulfuric acid to cause complete solution. The sulfates of calcium, strontium and barium will be the first to go into solution, while the more difficulty soluble radium sulfate will tend to remain in the undissolved portion. Thus, for example, on boiling 100 grams of the precipitate with 500 grams of sulfuric acid of 96% $H_2SO_4$ strength, about 50 grams of the precipitate have been found to go into solution while the remaining 50 grams remains undissolved. On filtering the boiling solution and drying the undissolved residue, a residue has been obtained about twice as strong in radium content as before. By repeating the fractional solution with boiling sulfuric acid, the radium content is continually increased until a pure or relatively pure or concentrated radium sulfate is obtained. It will be understood that residues relatively concentrated, and of varying degrees of concentration, can be obtained and used without further concentration of their radium content.

It will be seen that in the treatment of the ore the process is one according to which the ore is first boiled with the sulfuric acid to give the bi-sulfate in solution from which solution the sulfate is precipitated by water, and that this treating and extracting of the ore is a process of fractional solution, the more soluble sulfates tending first to go into solution. It will further be seen that in the concentration of such precipitates, the concentration is also a process of fractional solution according to which the more soluble sulfates are removed with relatively small amount of boiling acid while the more difficultly soluble radium sulfate tends to remain undissolved and to be thus concentrated.

While the invention has been illustrated by means of specific examples, yet it will be understood that the invention is illustrated by, but is not limited to, the specific processes of such examples, and that variations and modifications can be made therein without departing from the spirit and scope of the invention.

I claim:

1. The process of treating radium-containing ores and residues which comprises boiling the same with a sufficient amount of concentrated sulfuric acid to dissolve the radium in the form of bi-sulfate, and precipitating the dissolved radium as sulfate from such solution, substantially as described.

2. The process of treating radium-containing ores and residues which comprises boiling the same with a sufficient amount of concentrated sulfuric acid to dissolve the radium in the form of bi-sulfate, and precipitating the dissolved radium as sulfate from such solution by cooling, substantially as described.

3. The process of treating radium and barium-containing ores and residues which comprises boiling the same with concentrated sulfuric acid to dissolve the barium in the form of bi-sulfate and continuing the process until the radium also is dissolved in the form of bi-sulfate, and then precipitating the dissolved radium as sulfate from the resulting solution, substantially as described.

4. The process of treating radium-containing ores and residues which comprises boiling the same with sulfuric acid in amount insufficient to dissolve all the soluble sulfates as bi-sulfates, precipitating the dissolved sulfates with water, again boiling the undissolved residue with sulfuric acid to dissolve a further amount of the soluble sulfate as bi-sulfate, and precipitating the dissolved sulfates therefrom, substantially as described.

5. The process of treating radium-sulfate-containing ores and residues which comprises boiling the same with a relatively small amount of sulfuric acid to dissolve part of the more soluble sulfates than radium sulfate, separating the solution, repeating the boiling with sulfuric acid until the radium has been dissolved as bi-sulfate along with other sulfates, and precipitating the radium sulfate and other sulfates from such solution with water, substantially as described.

6. The process of concentrating sulfate residues containing radium-sulfate which comprises boiling the same with a relatively small amount of sulfuric acid to dissolve part of the more soluble sulfates than radium-sulfate, separating the solution, and repeating the boiling with small amounts of sulfuric acid until an insoluble residue remains relatively concentrated in radium-sulfate, substantially as described.

7. The process of obtaining radium-sulfate in relatively concentrated condition which comprises boiling radium-containing ores or residues with sulfuric acid to dissolve the radium in the form of bi-sulfate, precipitating the dissolved radium as sulfate along with other sulfates from such solution, boiling the precipitate with a relatively small amount of sulfuric acid to dissolve part of the more soluble sulfates than radium-sulfate, separating the solution, and repeating the boiling of the precipitate with relatively small amounts of sulfuric acid until an insoluble residue remains relatively concentrated in radium-sulfate, substantially as described.

In testimony whereof, I have hereunto set my hand in the presence of two subscribing witnesses.

OTTO PAUL CURT BREDT.

Witnesses:
ALFRED L. FREDEN,
GEO. SORDERGAARD.